Dec. 26, 1933.　　　　L. E. KOCH　　　　1,940,718
ELECTRICAL SWITCH AND CONTROL CIRCUIT THEREFOR
Filed Feb. 4, 1929　　　4 Sheets-Sheet 1

Inventor:
LAWRENCE E. KOCH

Dec. 26, 1933.    L. E. KOCH    1,940,718
ELECTRICAL SWITCH AND CONTROL CIRCUIT THEREFOR
Filed Feb. 4, 1929    4 Sheets-Sheet 2
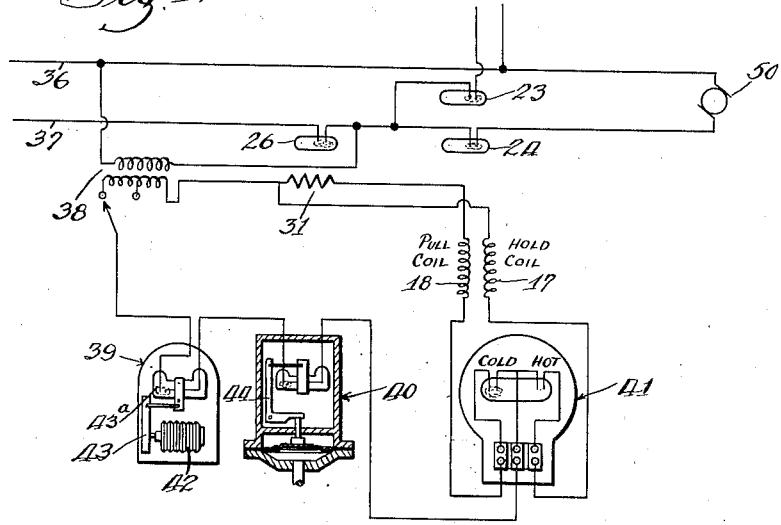
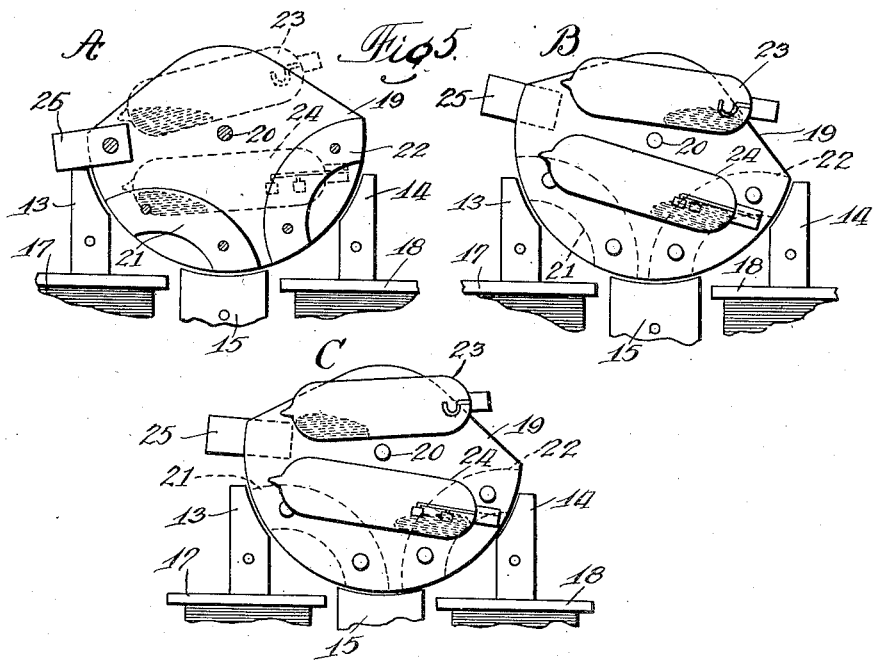
Inventor
LAWRENCE E. KOCH

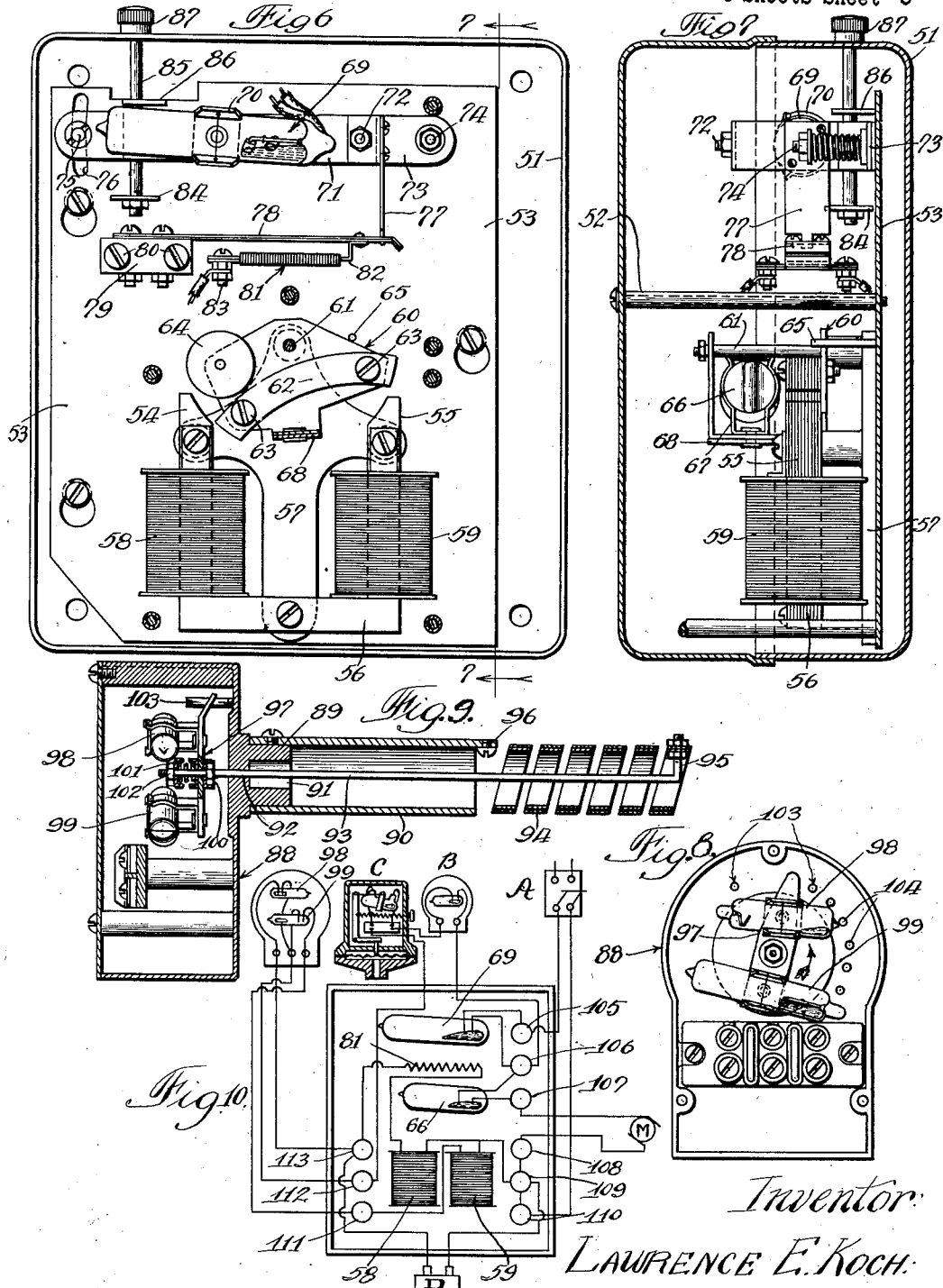

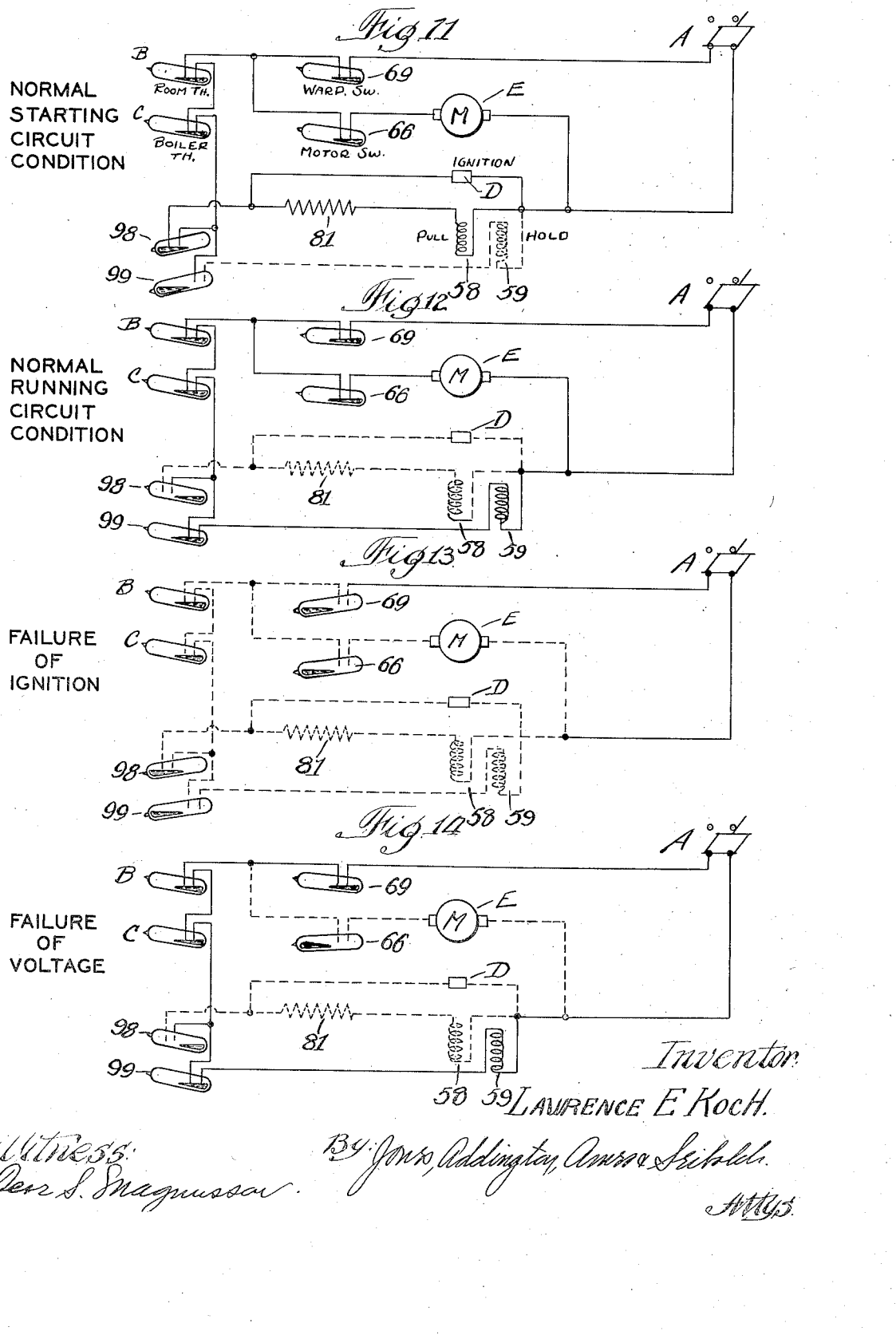

Patented Dec. 26, 1933

1,940,718

UNITED STATES PATENT OFFICE 1,940,718

ELECTRICAL SWITCH AND CONTROL CIRCUIT THEREFOR

Lawrence E. Koch, Elkhart, Ind., assignor, by mesne assignments, to Minneapolis-Honeywell Regulator Company, Minneapolis, Minn., a corporation of Delaware Application February 4, 1929. Serial No. 337,333

14 Claims. (Cl. 158—28)

This application is a continuation in part of an application filed July 30, 1927, Electrical switch and control circuit therefor, Serial No. 209,617.

This invention relates to an electrical switch and a control circuit therefor, and has special reference to a safety switch responsive to normal and abnormal conditions of a control circuit in which the same is embodied, the control circuit comprising a group of devices for operating and controlling an automatic system such for example as a heating system.

More particularly this invention has reference to a safety electrical switch for controlling the operation of an automatic heating system, the switch comprising tiltable switching members, one of which members is thermally actuated by electrical current in the control circuit to terminate the operation of the system during an abnormal condition thereof, and another of which is actuated by magnetically operated means to terminate the operation of the system during an abnormal condition thereof, governed by the failure or serious reduction of voltage in the control circuit.

In addition to a safety switch of the aforementioned type, the control circuit of the automatic heating system illustrated herein embodies a monitoring device actuated by temperatures in the stack of a boiler or furnace and thus the monitoring device is dependent upon proper burner operation for giving sequence to the operation of the system. Other devices employed in the control circuit of an automatic heating system may include a primary control such as a room thermosatic switch which may be disposed in a room or other enclosure to guard against excessive variations in temperatures therein, a thermostatic switch for limiting the range of temperature or pressure in a furnace or boiler, a motor for controlling the fuel supply to the burner and means for controlling the ignition of the fuel supply.

When the room thermostatic switch closes, one of a pair of electromagnets operates one of the tiltable switches of the safety electrical switch to close the electrical circuit through the motor, the thermally operated actuator of another of said tiltable switches of said safety switch being energized thereby together with the ignition means. Under normal conditions, the operation of the burner will control the monitoring device to give a proper sequence in the operation of the system whereby the thermally operated actuator and the ignition means will be de-energized and the other of said pair of electromagnets will operate in lieu of the first electromagnet to hold the first tiltable switch or motor switch in normal running position with the motor energized.

Should ignition fail to take place within a predetermined time limit, the thermally operated actuator will remain energized for an undue length of time and thereby actuate its associated tiltable switch into an open circuit position whereby the operation of the system is terminated and further operation can not take place until the safety switch is manually restored to normal operative position. However, should proper ignition be obtained but failure or serious reduction of voltage occur, the second electromagnet will be de-energized to open the motor circuit. Should voltage resume, the second electromagnet lacks sufficient power to close the motor switch and the system remains inoperative until the monitoring device brings about complete recycling with ignition.

It will hereinafter be particularly noted that the thermally operated actuator is connected in the control circuit entirely independent of the motor current and consequently the safety switch of this invention can be employed in connection with automatic systems using any size of motor having a frequency and voltage up to the capacity of the switch itself.

Hereinafter two control circuits will be separately described, both of which, however, embody the same inventive concept, the only difference therebetween being the inclusion of a transformer in one of the circuits whereby a number of the controlling devices are connected in a low voltage circuit. This latter condition is desired by some users to eliminate the necessity of approved high voltage wiring in the building.

One of the objects of this invention is to provide a safety switch operable under all abnormal conditions to terminate the operation of an automatic system and capable of full automatic normal operation.

A further object of this invention is to provide a safety switch which is simple and dependable in operation, may be easily installed and is simple and durable in construction.

A still further object of this invention is to provide an electrical control circuit of the type hereinbefore referred to wherein the safety switch is independent of the motor current.

It is also an object of this invention to provide an electrical control circuit wherein the primary control may receive but a part of the entire line current, thereby permitting the use of a small, sensitive device of a minimum expense.

Again, it is the further object of this invention to provide an electrical control circuit wherein the thermally actuated means for operating one of the switches received but a portion of the entire line current in its timing function.

Other objects and advantages will hereinafter be more fully described, and for a more complete understanding of the characteristic features of this invention, reference may now be had to the following description and accompanying drawings, in which latter:

Fig. 4 is a wiring diagram of the low voltage control circuit embodying the features of this invention;

Fig. 5 includes a number of similar views of one of the operating mechanisms showing changed positions thereof;

Fig. 6 is a front elevational view of a modified form of safety switch;

Fig. 7 is a vertical sectional view taken on the line 7—7 of Fig. 6;

Fig. 8 is a front elevational view of a monitoring device employed in the electrical high voltage control circuit in which the latter safety control switch is also embodied;

Fig. 9 is a vertical central sectional view of the device of Fig. 8;

Fig. 10 is a schematic diagram of the electrical control circuit of this invention showing more particularly the wiring and connections for the specific safety switch illustrated in Figs. 6 and 7;

Fig. 11 is a schematic diagram showing in simplified form the diagram illustrated in Fig. 10 which is the normal starting circuit condition;

Fig. 12 is a view similar to Fig. 11 showing the normal operating or running circuit condition;

Fig. 13 is a schematic diagram showing the condition of the circuit upon the failure of ignition; and Fig. 14 is a schematic diagram showing the condition of the control circuit upon failure of voltage.

Figure 1:
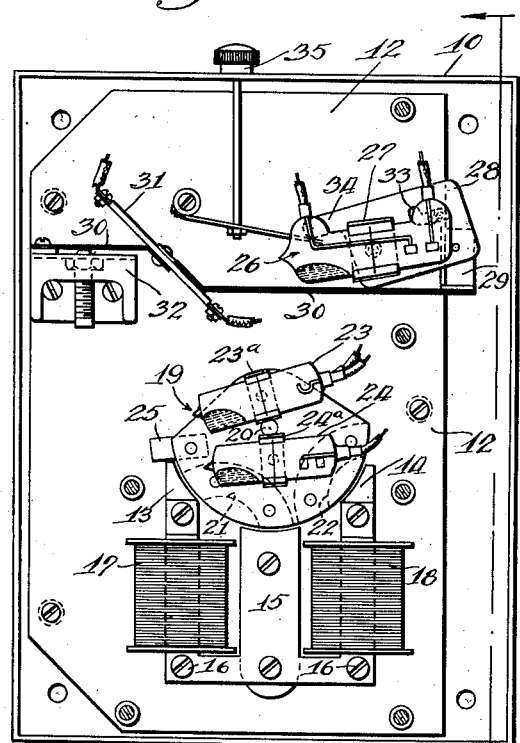
Figure 1 is a front elevational view of the safety electrical swicth embodied in this invention.
Figure 2:
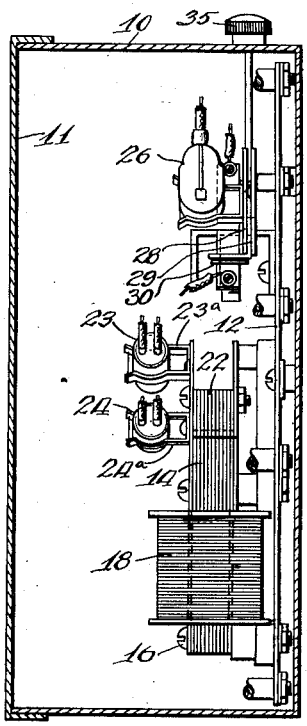
Fig. 2 is a vertical sectional view taken on the line 2—2 of Fig. 1.

Referring to the drawings and more particularly to Fig. 1 thereof, the electrical switch comprises a casing 10 having a cover 11 preferably pivotally secured thereto at the upper end thereof and a mounting plate 12 secured to the inner rear wall thereof for holding the operating mechanism. The mounting plate 12 is spaced from the wall in order to accommodate securing means for the mechanism mounted on the plate, the latter greatly facilitating the assembly of the switch.

An electromagnet, comprising a structure subtantially of a double horseshoe type having a pair of outer vertically extending arms 13 and 14 and a central vertically extending arm 15 connected in an iron circuit and preferably integrally formed of iron laminations, is fixedly secured to the mounting plate 12 by means of screws 16 or other suitable means. A pair of coils 17 and 18 are disposed on the arms 13 and 14 respectively, the coil 17 being hereinafter termed a "hold" coil and the coil 18 being hereinafter termed a "pull" coil by reason of their characteristics which will hereinafter be more fully pointed out.

An armature 19, preferably shaped as a segment is pivotally mounted as at 20 on the mounting plate 12, the center for the arcuate edge of the segment being coaxial with the pivotal point thereof. Also, the upper ends of the vertically extending arms 13, 14 and 15 are arcuate and the center of the radii thereof coincides with the center of the radii of the arc of the segment of the armature 19. The armature is preferably formed of a pair of spaced plates, shaped as above mentioned, having a pair of arcuately shaped core portions 21 and 22 disposed therebetween and secured thereto. These core portions are preferably formed of iron laminations of a thickness substantially the same as the vertically extending arms and have the ends thereof coincide with the arcuate edge of the spaced plates.

A pair of tiltable mercury contactor switches 23 and 24 are disposed on the armature 19, the contactors being positioned angularly with respect to each other and in suitable clips 23a and 24a The contactors are of the usual type comprising hermetically sealed glass containers each having a pair of spaced cooperating electrodes disposed therein at the right hand ends thereof, and a quantity of mercury or other electrical conducting fluid likewise disposed therein and adapted to bridge the electrodes when the contactors are tilted past a horizontal level to one of their extreme positions.

The normal inoperative position of the armature 19 is shown in A of Fig. 5 of the drawings, a weighted projecting member 25 being secured between the spaced plates of the armature and resting against the upper end of the vertically extending arm 13. In this position of the armature, the mercury rests at the left hand end of each of the contactors 23 and 24 and at the opposite ends from the electrodes. In practice, the contactor 24 is tilted at an angle of approximately 6° and the contactor 23 is tilted at an angle of approximately 16°, both in the same direction. However, these inclinations are given as a matter of illustration for purposes of clearer description and this invention is not to be limited thereby.

In the operation of the switching mechanism just described when the pull coil 18 is energized, sufficient power is obtained for the electromagnet to rotate the armature 19 to a position such as is shown in B of Fig. 5 of the drawings wherein the lines of force thread through the ends of the vertically extending members 14 and 15 into the ends of the arcuate member 22 to complete the magnetic field through the pull coil portion of the electromagnet and one side of the armature 19. In this condition of the armature 19, the mercury flows to the right in each of the contactor tubes 23 and 24 to bridge the electrodes therein and to establish an electrical circuit therethrough.

When the pull coil 18 is deenergized and the hold coil 17 is energized, the latter is unable to hold the weighted member 25 and the weight of the tilted armature 19 in its changed position whereby the armature drops back toward the position from which it had been moved by the pull coil until it reaches a position such as is shown in C of Fig. 5 of the drawings. In this position, the lines of force thread through the upper end of the armature 13 through the arcuate-shaped core 21 and into the common vertically extending member 15 to complete the magnetic field through the hold coil portion of the electromagnet and the armature. The hold coil has sufficient power to hold the armature in this position, although it has not enough power to operate the armature into such a position after the coils have been deenergized, as when the hold coil 17 is deenergized the armature 19 is permitted to drop by its own weight to the position as is shown in A of Fig. 5 or its normal inoperative position. If the hold coil were energized after the armature has obtained this normal inoperative position it will have insufficient power to attract the armature to close the electrical circuits through the contactors.

A tiltable mercury contactor switch 26 is mounted in the clip 27 which latter is in turn fixedly mounted on a latch plate 28 within the upper portion of the casing 10. The latch plate 28 is pivotally mounted at the lower right hand portion thereof to a bracket 29 secured to a substantially horizontally extending two-part bimetallic member 30. A heating element 31 is disposed between the ends of the two-part bimetallic element 30 and actuates the latter under predetermined conditions hereinafter described. In the operation of this heating or resistance element, the bi-metallic element 30 is flexed upwardly by the heat from the former to pivot the latch plate 28 to tilt the contactor tube 26 thereby breaking the electrical circuit therethrough. One end of the bi-metallic element 30 is secured to a bracket 32, which latter has a screw member for bearing against the underside of the bi-metallic element in order to obtain an adjustment for the operation of the contactor 26.

It is desirable that the contactor 26 can not be restored to a normal operative position unless manually reset after having been actuated to open circuit position in response to the aforesaid predetermined conditions hereinafter described, and therefore, an L-shaped aperture 33 is provided on the edge opposite an extension 34 and above the pivot for the latch plate to engage a pin fixedly mounted on the mounting plate 12. The latch plate is locked between the horizontally extending leg of the slot 33 and the pivotal point for the latch plate after the latch plate has been operated into a position such that the mercury flows away from the electrodes to break the electrical circuit therethrough. The normal operative position of the contactor 26 is such that the mercury bridges the electrodes to complete en electrical circuit therethrough and the vertically extending portion of the L-shaped slot engages the pin secured to the mounting plate. This position may now be obtained by means of restoring the switch as by means of a handle 35 extending through the casing and fixed to a pivoted arm in engagement with the projecting portion 34 of the latch plate. For a better understanding of the operation of this particular construction, attention is called to a copending application, Serial No. 186,883, filed April 27, 1927, by Louis A. M. Phelan, and assigned to the assignee of the present application.

Referring now to Fig. 4, a wiring diagram of the low voltage circuit is shown wherein one end 36 of the supply line is connected through the motor, the main line switch 24, the safety switch 26 to the other end of the line 37. One electrode of the ignition switch 23 is connected to the line between the safety switch 26 and the main switch 24 and the other electrode is connected to one terminal of the ignition means, the other terminal of the latter being connected to the other side 36 of the line. The primary of a transformer 38 is connected across this high voltage circuit, one end thereof being connected between the safety switch 26 and the main switch 24. One end of the secondary of the transformer 38 is connected through a room switch 39, a pressure switch 40 to a stack switch 41, through the pull and hold coils of the electromagnet, the heating element 31 and back to the other side of the secondary of the transformer 38. The transformer herein referred to is for the purpose of providing an electrical supply of low voltage for the secondary control instruments 39, 40 and 41. It will be readily apparent that due to the varying condition of voltage to which an oil burner apparatus is subjected, an invariable current is preferred for the low voltage secondary control instruments and this can be accomplished by making the transformer 38 a constant current transformer or one in which there is sufficient magnetic "leakage" between the primary winding and the secondary winding so that a substantially constant current will flow in the secondary circuit independent of the voltage impressed upon the primary winding, within limits of course. Before attempting to describe the various conditions of the electrical circuit just pointed out, a brief description of the switches 39, 40 and 41 will now be recited.

The thermostatically operated room switch 39 comprises a mounting base to which is secured a bracket having an expansible and contractible bellows type thermostatic element 42. One end of the bellows engages an actuating arm 43 pivoted at its lower end, the upper and free end thereof being connected to a tiltably mounted mercury contactor tube 43a of the usual type as hereinbefore described for making and breaking an electrical circuit therethrough. Upon an expansion and contraction of the bellows 42 due to the temperature of the room in which it is disposed, the actuating arm 43 is moved and causes the contactor 43a to tilt and to open or to close the electrical circuit therethrough. For a better understanding of the nature of this room switch, reference may be had to a copending application, Serial No. 739,006, filed September 22, 1924, by Louis A. M. Phelan, and assigned to the assignee of the present application.

The pressure operated boiler switch 40 comprises a casing having a diaphragm chamber at the lower end thereof and a diaphragm extended between the flanged portions thereof to form an upper and lower chamber, the lower chamber forming a pressure chamber into which pressure is admitted through a conduit. A mercury tube contactor of the usual type hereinbefore described is pivotally mounted within the casing and is tilted by means of a vertically disposed member 44 having a link extending therefrom to engage the pivotal support for the contactor. The actuator 44 is pivoted at its lower end and has a substantially horizontally extending portion preferably integrally formed therewith extending to engage a vertically extending member secured to the diaphragm. In the operation of this switch, it will be apparent that any pressure recorded on the diaphragm will actuate the actuating member 44 to tilt the contactor in a direction to make or break in the electrical circuit therethrough. However, a more detailed description of the construction and operation of this electrical switch may be obtained by referring to a copending application, Serial No. 604,162, filed December 1, 1922, by Louis A. M. Phelan and Clifford Hotchkiss, and assigned to the assignee of the present application.

The thermostatically operated stack switch 41 comprises a casing having a tiltable mercury contactor tube disposed therein and mounted on a rod extending through the casing. The rod is preferably actuated by means of a helical bi-metallic element or any other suitable thermostatic means whereby a rotation of the rod to tilt the tube may be obtained. The switch 41 is mounted on the stack of the heating unit and is actuated by the heat of combustion therefrom. When there is no heat in the furnace, the contactor occupies a position such that the mercury rests at the left hand side of the tube to complete an electrical circuit through the electrodes disposed at that end of the tube and after the heating unit has obtained a predetermined degree of temperature, the helical bi-metallic element actuates the rod to tilt the contactor to a position such that the mercury flows to the right hand side of the tube to complete an electrical circuit through the electrodes disposed at that end of the tube. The operation of this device may be more clearly obtained by referring to a copending application, filed December 17, 1925, by Louis A. M. Phelan, and assigned to the assignee of the present application and bearing Serial No. 75,895.

The tiltable mercury contactor tube briefly described in the foregoing description of the stack switch 41 comprises a hermetically sealed glass container having two pairs of spaced cooperating electrodes disposed therein, one pair of electrodes being disposed adjacent each end of the container and the inner electrodes of each pair being connected together. This switch is of the type commonly called a single-pole double-throw switch wherein the inner electrodes 45 and 46 are connected together at a common terminal 47. The other electrodes are designated 48 and 49.

Figure 3:
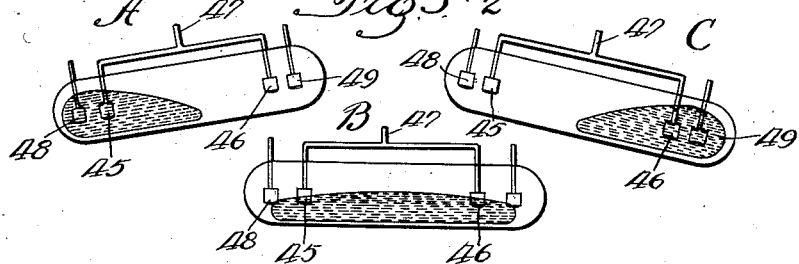
Fig. 3 is a view showing changed positions of a switch utilized in a system embodying the invention.

By referring now to Fig. 3 of the drawings, the various positions of the contactor of the stack switch 41 is shown. By assuming that combustion is taking place in the burner of the furnace or boiler, the thermostatic means mounted in the stack actuates the supporting means for the contactor to tilt the contactor from a position A to a position such as is shown in B wherein an electrical circuit is completed through each pair of coacting contacts by means of the mercury extending across substantially the entire length of the tube. A further rotation of the actuating rod to tilt the contactor will obtain a position such as is shown in C wherein the mercury is caused to bridge the electrodes 46 and 49 to complete an electrical circuit therethrough. This construction will hereinafter be referred to as an overlapping stack switch for reasons which are apparent.

It is desirable that an overlapping stack switch be employed to control the energization of the pull and hold coils for the reason that the hold coil is not of the same value as the pull coil, the former being unable to operate the armature 19 from a normal inoperative position. Therefore, when the pull coil is energized to operate the armature to a position such that electrical circuits exist through both of the switches mounted thereon, the hold coil is energized before the pull coil is deenergized in order to prevent the armature from dropping back to its original starting position. The hold coil is able to maintain the armature in the position such as is shown in B of Fig. 5 wherein the main line switch 24 controlling the operation of the motor is in a closed circuit position and the ignition switch 23 is in an open circuit position.

The motor 50, the safety switch 26, the main line switch 24 and the ignition switch 23 are all connected in series in the high voltage line. The remaining switches and controls therefor are connected in the low voltage circuit. Assuming that the temperature in the room to be heated has dropped, the pressure in the boiler is low, and therefore, the switches 39 and 40 are in a closed circuit position. The contactor of the stack switch 41 is in a cold position with the mercury to the left of the tube completing an electrical circuit through the electrodes 45 and 48, there being no combustion in the furnace. The ignition switch 23 is in its normal open circuit position as is the main line switch 24, the safety switch 26 occupying a closed circuit position which is its normal operative position. An electrical circuit now exists from one side of the line through the safety switch 26 and the primary of the transformer to the other side of the line to energize the secondary of the transformer 38. An electrical circuit now also exists from one side of the secondary of the transformer 38 through the switches 39 and 40, the cold position of the stack switch 41, the pull coil 18, the heating element 31 to the other side of the secondary of the transformer. The pull coil 18 being energized attracts the armature 19 to a position such as is shown in B of Fig. 5 of the drawings wherein an electrical circuit is obtained through both the contactors 23 and 24. The high voltage circuit is now completed through the motor and through the ignition means whereby fuel is supplied to the burner of the boiler or furnace and is ignited.

If a proper combustion is obtained in the boiler, the contactor of the stack switch 41 will eventually move to a hot position with the mercury to the right of the tube whereby an electrical circuit will exist from one side of the secondary of the transformer 38 through the room thermostatic switch 39, pressure switch 40 through the hot side of the stack switch 41 and the hold coil to the other side of the secondary of the transformer shunting around the heating element 31. As before stated, insufficient power is obtained in the hold coil to hold the armature 19 in its raised position such as is shown in B of Fig. 5 of the drawings. Therefore, the armature drops to a position such as is shown in C of Fig. 5 wherein the electrical circuit is broken through the ignition switch 23, the electrical circuit being permitted to remain closed through the main switch 24 to continue the operation of the motor 50. Further, as hereinbefore pointed out, the hold coil 17 is energized before the pull coil is deenergized for the reason that sufficient energy cannot be obtained in the hold coil to raise the armature 24 back to an operative position.

When a predetermined temperature has been obtained in the room, the bellows 42 of the room thermostatic control will actuate the arm 43 to tilt the contactor 39 to a position such that the electrical circuit is broken therethrough. This action, of course, breaks the electrical circuit through the stack switch and the hold coil and deenergizes the latter to permit the armature 19 to drop to its normal inoperative position such as is shown in A of Fig. 5 of the drawings. The electrical circuits through the contactors 23 and 24 being broken, the operation of the motor 50 and the ignition means is discontinued, and thereafter no combustion will be obtained in the furnace and the stack will tilt to a cold position with the mercury to the left. The circuit is then in condition for another cycle of operation after either the room thermostatic switch 39 and the pressure switch 40 are sufficiently cooled to obtain closed circuit positions. However, should a proper combustion not be obtained in the boiler for any reason whatsoever, the contactor of the stack switch 41 remains in a cold position as the helical thermostatic element will not be heated to actuate the actuating means or rod of the contactor and as a consequence thereof, the current will continue to flow through the resistance element 31 for an undue length of time whereby this irregularity causes the resistance element to flex the bi-metallic element 30 and tilt the safety control switch 26 to an open circuit position thereby deenergizing the pull coil which terminates the operation of the motor 50 and the ignition means. After the system has been terminated in this manner, the system must be manually reset and the irregularities remedied before operation is possible again.

Referring now to Figs. 6 to 14 inclusive, of the drawings, and more particularly to Figs. 6 and 7 thereof, the safety electrical switch illustrated thereby comprises a casing 51 having a cover preferably removably secured thereto as by means of a screw member engaging a central supporting member 52 extending from and attached to the mounting plate 53. The mounting plate is in turn secured to the rear wall of the casing 51 as by means of screws projecting therethrough and through spacers secured between the mounting plate and the rear wall. The mounting plate is for the purpose of holding the operating mechanism in order that the assembly of the mechanism may be greatly facilitated.

An electromagnet comprising a pair of vertically extending arm members 54 and 55 connected at their lower ends by means of a horizontally extending member 56 is rigidly secured to a bracket 57 which latter is suitably secured to the mounting plate 53. The members 54, 55 and 56 are preferably formed of iron laminæ to form the iron circuit of the electromagnet which is shown in the drawings as of the horse-shoe type. A pair of coils 58 and 59 are disposed on the vertically extending arms 54 and 55, respectively, the coil 58 being hereinafter termed a pull coil and the coil 59 being hereinafter termed a hold coil by reason of their characteristics which will hereinafter be more fully pointed out.

An armature 60 is preferably pivotally mounted on a pin 61 extending through the upper end thereof and into a suitable bearing portion on the mounting plate 53. The armature 60 preferably comprises a plate having a core portion 62 disposed thereon and secured thereto by means of screws 63. The core portion 62 is preferably composed of iron laminæ arcuate in shape, the ends thereof being arcuate and co-extensive with and adjacent to the arcuate upper ends of the vertically extending members 54 and 55 when the armature is in one of its predetermined positions. However, a weight 64 is mounted on the left-hand side of the armature in order to normally hold the armature in a position such that the core portion 62 is held out of the influence of the iron circuit formed through the electromagnet coils. A stop member 65 is provided for limiting the movement of the armature when the latter is urged to rotate on the pivot 61 by the weight 64 and is preferably secured to the mounting plate 53.

A tiltable mercury contactor tube 66 is mounted on the armature 60 and comprises a hermetically sealed glass container having a pair of spaced cooperating electrodes disposed adjacent one end thereof and a body of current conducting fluid such as mercury, also disposed therein, to bridge or to flow away from the electrodes in order to make or break an electrical circuit therethrough when tilted into its various predetermined positions. The tube 66 is mounted in a clip 67 which latter is in turn fixedly mounted to an arm 68 preferably formed integrally with and extending outwardly and thence upwardly from the plate of the armature 60 to form a substantially U-shaped bracket. The upper end of the arm 68 is likewise pivotally mounted on the pin 61 to determine definitely the proper position of the tube 66 and to provide an efficient bearing construction.

The normal inoperative position of the armature 60 is shown in Fig. 6 of the drawings wherein the weighted member 64 urges the armature in a direction whereby the plate is limited in its movement by the stop member 65. In this position of the armature, the mercury in the contactor rests at the left-hand end thereof away from the electrodes.

In the operation of the switching mechanism just described, when the pull coil 58 is energized, sufficient energy is obtained therethrough to rotate the armature 60 to a position wherein the lines of force thread through the ends of the vertically extending members 54 and 55 and the core portion 62 of the armature 60 to complete a maximum magnetic iron field through the pull coil portion of the electromagnet, the circuit being completed through the members 54, 56, 55 and 62. In this condition of the armature 60, the mercury has shifted to the right to bridge the electrodes and to establish an electrical circuit therethrough.

The hold coil 59 as will hereinafter be more particularly pointed out with reference to the electrical control circuit, is energized just prior to the de-energization of the pull coil 58. The hold coil 59 has just sufficient power to hold the armature 60 in the position into which the pull coil has operated the armature, but lacks sufficient power to operate the armature into such a position from its normal position in which the contactor is in open circuit position. After once having deenergized the hold coil 59, the weight 64 rotates the armature 60 to its normal inoperative position, and thereafter should the hold coil 59 be energized it will have insufficient power to attract the armature to close the electrical circuit through the contactor.

A second tiltable electrical switch 69, comprising a sealed container having a pair of spaced cooperating electrodes disposed adjacent one end thereof and a body of electrical conducting fluid likewise disposed therein for bridging or flowing away from the electrodes, is mounted in a clip 70 which latter is in turn fixedly mounted on an arm 71. One end of arm 71 is formed into a U-shaped portion and is pivoted thereat on a pin 72 extending from an arm 73. The latter arm 73 is pivotally mounted as at 74 to the mounting plate 12 and extends laterally of the casing, the free end thereof being adapted to be adjustable in various fixed positions by means of a screw member 75 extending through a slot 76 and engaging the walls thereof in any suitable manner. For example, a threaded screw having an enlarged head extends through the slot 76 and through an aperture in the arm 73 and has a cap on the outside of the arm which is internally threaded to engage the screw, thereby clamping the head of the screw and the arm 73 to the fixed mounting plate 53. When it is desired to raise or lower the arm 73, the cap of the screw is loosened whereafter the free end of the arm 73 is raised or lowered on its pivot 74 into a desired position, and the cap is screwed tightly to hold the arm in that position. However, should the cap 75 become loosened a frictional securing element is disposed on the pivotal end 74 to restrain any movement of the arm 73. The frictional means comprise a screw which extends from the mounting plate on which the arm is mounted, a washer and nut being mounted on the outer end thereof and having a coil spring between the washer and the arm to urge the latter in a tight frictional engagement with the mounting plate.

A depending member 77 is fixedly secured to the U-shaped portion of the arm 71 and extends to engage an aperture in a horizontally extending bi-metallic element 78. The aperture is preferably disposed on the outermost portion of the free end of the bi-metallic element 78, the other end thereof being fixedly mounted on an insulating support 79 which latter is fixedly mounted as by means of screws 80 to the mounting plate 12. The bi-metallic element 78 is of the usual type comprising a pair of metal strips of different co-efficients of expansion intimately united along their adjacent and abutting edges. The bi-metallic element 78 is adapted to warp in a direction downwardly or away from the above-mentioned arms 71 and 73 when actuated by thermal means.

A resistor 81 is mounted on the underneath side of the bi-metallic element 78, the resistor comprising a metallic member 82 preferably of brass secured at one end thereof to the bi-metallic elements 78 and extending preferably parallel therewith along substantially the entire length thereof. A resistance wire is wound around insulating strips provided on each side of the supporting member 82 and the wire is thereby held in an insulated relation therefrom. The ends of the resistance wire are fastened to terminal posts 83 secured to the insulating strips and are connected in the electrical control circuit as will hereinafter be more fully explained.

In the operation of the mechanism just recited when the resistor 81 is energized, heat therefrom will rise and tend to warp the bi-metallic member 78, thereby releasing the arm 77 from the aperture in the bi-metallic member which it engages. The weight of the contactor tube 69 will cause the arm 71 to pivot on the pin 72 to an inclined position wherein the mercury in the contact or tube flows away from the electrodes to break the electrical circuit therethrough. Ordinarily an electrical circuit exists through the contactor 69 for the reason that the electrodes are disposed on the right-hand end and the tube is slightly tilted toward that end in a normal operative position whereby the mercury flows thereto to bridge the electrodes. Thereafter, when the arm 71 by the weight of gravity falls to the position just described, the mercury flows away from the electrodes to break the electrical circuit existing therethrough.

In order to prevent another cycle of operation after an abnormal condition of the system has obtained before the attendant is made aware of the condition of the system, it is desirable that a complete recycling of the system is not possible excepting by the manual restoration of the safety switch. Therefore, the arm 71 stops against a washer 84 disposed on the lower end of a rod 85 which latter extends through an aperture in a bracket 86 formed on the mounting plate 53 and thence through the casing 51. A knob 87 is fixedly mounted on the upper end of the rod 85 and limits the downward movement thereof. In resetting the switch 69 it is not necessary to remove the cover of the casing, it being only necessary to raise the knob 87 whereafter the washer 84 urges the arm 71 upwardly until the depending member 77 secured to the pivotal end thereof, engages the aperture in the bi-metallic arm 78. Thus, by means of the engagement of the depending member 77 in the aperture of the bi-metallic element 78, the switch 79 is held in a normal closed circuit position.

By reason of the arm 73 being pivotally mounted and therefore adjustable, the pivotal mounting 72 for the arm 71 is likewise adjustable. A movement upwardly or downwardly of the arm 73 will raise or lower the pivotal mounting pin 72 and thus raise or lower the depending member 77 which engages an aperture in the bi-metallic element 78. It will thus be apparent that when the depending member 77 is lowered into the aperture, a greater movement of the bi-metallic element 78 is required and therefore a greater amount of energy is required in the resistor 81 in order to permit a disengagement therebetween. Conversely, when the depending member 77 is moved upwardly a less amount of flexing of the bi-metallic element 78 and consequent energy in the resistor 81 is necessary to disengage these members. By this simple slot adjustment, the ignition period, which will hereinafter be more fully described, can be extended or reduced to suit each individual installation.

Referring now more particularly to Figs. 8 and 9 of the drawings, the hereinbefore mentioned monitoring device for determining the sequence control of the system is more particularly shown and comprises a casing 88 having a projecting portion 89 preferably formed integrally therewith extending from the rear side thereof and a tubular member 90 secured thereto and extending a substantial distance therefrom for engagement with a stack of a boiler or furnace. A central aperture 91 is formed in the projecting portion 89, the latter having a reduced aperture 92 extending co-axially with said aperture 91 and communicating with the interior of the casing 88. A rod 93 is journalled in the aperture 92 and extends into the casing, the rod also extending a substantial distance outside the tubular member 90. One end of an helical bi-metallic element 94 is secured to the end 95 of the rod 93, the latter end being bent at right angles to the longitudinal axis of the rod. The other end of the helical bi-metallic element 94 is fixedly secured to a lug 96 formed preferably integrally on the tubular member 90. By reason of the helical bi-metallic element 94 being disposed in the stack of a furnace or boiler, the heat therefrom will actuate the element thereby imparting a rotatable movement to the shaft 93.

An actuating arm 97 is loosely mounted on the other end of the rod 93 within the casing 88 and extends a substantial distance on each side thereof. A pair of contactor tubes 98 and 99 are mounted on the actuator arm 97, one on each side of the pivotal point. These contactor tubes are of the usual type as hereinbefore referred to in this specification.

The rod 93 is threaded for a substantial distance along the inner end thereof to receive a nut 100 against which the actuator 97 is urged by means of one end of the coil spring 101, the other end of the spring being limited by means of a nut 102. In order to centrally locate the compression spring 101, cup-shaped members are journalled on the shaft, the members having an inside diameter of substantially the same diameter as the external diameter of the spring. These cup-shaped members also provide a good effective bearing surface between the actuating arm 97 and the nut 100, also between the actuator 97 and the compression spring 101. It is quite apparent that a movement of the helical bi-metallic element 94 and a consequent rotation of the rod 93, will impart a partial rotation to the actuator 97 inasmuch as the nuts 100 and 102 are fixed to the shaft and the actuator 97 is held in a frictional engagement therebetween.

Stop members 103 are mounted at the upper end of the actuator 97 and engage apertures in the rear wall of the casing. It will be noted that a number of apertures 104 are provided in the rear wall of the casing in order that the distance between the two stop members may be adjusted. The upper end of the actuator 97 extends between the adjustably disposed stop members 103 and is limited in its movement thereby. However, the helical bi-metallic element has an overriding movement; that is, should the upper end of the actuator 97 engage the stop member 103 in its movement in one direction, a continued movement of the helical bi-metallic element 94 will have no effect on the actuator 97 but upon a reverse movement of the element 94, the actuator 97 will immediately move in the reverse direction.

The mercury contactor tubes 98 and 99 are disposed at an angle relative with each other in order that an electrical circuit may be made through one before the electrical circuit is broken through the other. Such a construction is clearly described in a co-pending application, Serial No. 326,213, filed December 15, 1928, by Paul S. Bear and assigned to the assignee of this invention. By referring to Fig. 8 of the drawings, it will be noted that contactor 98 occupies a position closer to the horizontal than the contactor 99. Therefore a rotation of the actuator 97 in the direction of the arrow will cause the mercury in tube 98 to bridge the electrodes therein before the mercury in the tube 99 flows away from the electrodes therein. The reason for the making of electrical circuit through one of the contactors prior to the breaking of the electrical circuit through the other of the contactors will be more fully explained with reference to the control circuit which will now be described.

Referring now to Fig. 10 of the drawings, the high voltage control circuit is illustrated diagrammatically and includes a line switch A connected in the power lines, one side thereof being connected to the terminal 105 of the safety electrical switch and the other side thereof being connected to the terminal 110. One of the electrodes of the contactor 69 is connected to the terminal 105, the other electrode being connected to the terminal 106. One electrode of the contactor 66 is connected to the terminal 106, the other electrode being connected to the terminal 107. The motor M is connected between the terminals 107 and 108. A thermostatic switch B and a pressure switch C are connected in the system in series with each other, one side of the thermostatic switch being connected to the terminal 106 and the other side of the pressure switch C is connected to the terminal 112. One end of the resistor 81 is connected to the terminal 113, the other end thereof being connected to one end of the pull coil 58, the other end of the latter being connected to the terminal 109. One end of the hold coil 59 is connected to a terminal 111, the other end thereof being connected to the terminal 109. An ignition means such as a spark coil or a magnetic gas valve D, operating initially to ignite the fuel supplied to the burner, is connected between the terminals 113 and 109. The monitoring device or sequence control previously referred to is connected in the electrical control circuit, one of the electrodes of each of the contactors 98 and 99 being connected to a common terminal 112, the other electrode of contactor 98 being connected to terminal 113 and the other electrode of contactor 99 being connected to terminal 111.

The room thermostatic switch B, which will be referred to as the temperature control switch, is, of course, disposed in any convenient place in a room or other enclosure, the temperature of which is to be controlled and which is heated by a fuel burner whose operation is controlled by the pressure control system. The boiler control switch C is usually a pressure-operated device and is subjected to the pressure obtaining in the boiler. This switch may be mounted upon the boiler which is heated by means of the fuel burner, the operation of the latter being in turn controlled by the motor M. The boiler switch may be of any well-known type and is preferably one in which the electrical switch therethrough is disconnected as soon as the boiler pressure exceeds a certain predetermined maximum and operates to close the electrical circuit therethrough when the boiler pressure falls below a certain predetermined minimum value.

Referring now more particularly to Figs. 11, 12, 13 and 14, the circuit conditions shown therein refer to the normal starting circuit condition, the normal operating circuit condition, the condition of circuit during failure of ignition and the condition of the circuit during failure of voltage respectively. When the temperature of the room to be heated has reached a certain predetermined minimum value, the tiltable electrical contactor tube of the temperature control switch B is actuated into a closed circuit position as likewise is the tiltable contactor tube within the boiler or pressure thermostatic switch switch C, the pressure in the boiler having reached a predetermined minimum value. An electrical circuit now exists from one side of the line through the warp switch 69, room thermostatic switch B, pressure switch C, contactor 98, resistor 81, pull coil 58, to the other side of the line. The pull coil 58 being energized actuates the armature 60 to tilt the motor switch 66 into a closed circuit position whereby the motor M is energized to operate the fuel feeding means. At the same time that the pull coil 58 is energized the ignition device D is energized to produce a spark for igniting the gas pilot flame or for energizing the spark coil to ignite the fuel supply.

Assuming that combustion has been established the circuit conditions in Fig. 11 will have been changed to those as illustrated in Fig. 12 wherein the helical bi-metallic element 94 has actuated the rod 93 to tilt the tubes 98 and 99 in an opposite direction to make an electrical circuit through the contactor 99 and to break the heretofore existent circuit through the tube 98. Thus the pull coil and the ignition means are deenergized and the control circuit now exists from one side of the line through the warp switch 69, room thermostatic switch B, pressure switch C, tube 99, hold coil 59, to the other side of the line, some of the current passing through the contactor 69 being directed through the contactor 66 to energize the motor and thence to the other side of the line. In this condition of the control circuit, the motor will operate to supply fuel to the burner until the temperature of the room has reached a predetermined maximum value, whereafter the operation of the system is normally terminated by reason of the thermostatic element of the switch B actuating the tiltable contactor tube therein into a position such that the mercury flows away from the electrodes to break the electrical circuit therethrough and the system will then be in condition for recycling.

In the event that combustion has failed to be established within the combustion chamber after the circuit conditions of Fig. 11 have been initiated, then, in that event, the circuit conditions are those shown in Fig. 13. The room thermostatic switch B and the pressure switch C still occupy a closed circuit condition. However, the helical bi-metallic element 94 has not actuated to tilt the tubes 98 and 99 to a position such that the contactor 99 occupies a closed circuit position. Therefore the resistor 81 is supplied with electrical current for an undue length of time and sufficient heat therefrom rises to warp the bi-metallic element 78 to tilt the contactor 69, as has been hereinbefore recited. After the contactor 69 is actuated into an open circuit position, the pull coil is de-energized, whereafter the armature 60 is permitted to drop to an inoperative position wherein the mercury flows away from the electrodes in the contactor 66. The motor switch and the ignition switch being in an open circuit position, the motor and the ignition means for the burner together with the electro-magnetic means are completely de-energized, and, as has previously been recited, the system may be put into an operative condition only by manual means such as has been recited with reference to the operating handle 87.

If after having obtained a normal operating condition a failure of voltage should occur in the line or should a serious reduction occur therein, the hold coil 18 would be de-energized and permit the armature 69 to drop to a normal inoperative position wherein the mercury is permitted to flow away from the electrodes in the tube 66. If but a very short time should elapse and the voltage resume, the hold coil 59 will lack sufficient energy to attract the armature 60 to tilt the tube 66 to a position such that an elecrical circuit exists therethrough. The motor switch 66 having been tilted to an open circuit position, the motor E becomes de-energized to terminate the operation of the system and this condition will remain until the electrical bi-metallic element 94 of the stack switch cools and brings about complete re-cycling with ignition. It will be noted that the unequal values of the magnetic coils 58 and 59 are responsible for this last mentioned safety condition of the circuit. Without these unequal values of the coils and the resultant safety effects, should the voltage fail at a time when the ignition means are in an inoperative condition, the burner would cease to operate for a short time and continue on again without becoming ignited, thereby wasting fuel until at such time as the monitoring device or stack switch cools to bring about re-cycling, when a conflagration or explosion might occur. It is readily seen that the present invention eliminates such a condition.

While several embodiments of this invention have been herein shown and described, it is to be understood that various modifications thereof will be apparent to those skilled in the art without departing from the spirit and scope of the invention, and therefore the same is to be limited only by the scope of the prior art and the appended claims.

I claim:

1. In an electrical control circuit for a combustion system comprising a motor therefor which is connected in a circuit of relatively high voltage, a main switch for energizing said motor, an ignition switch for energizing the ignition means of said combustion system, a transformer for energizing a low voltage circuit, automatic means in said low voltage circuit for controlling the operation of said main switch and said ignition switch, said automatic means including an armature upon which said main switch and said ignition switch are mounted, magnetic means for tilting said armature to one position whereby said switches are moved to closed circuit positions to initiate combustion, and another magnetic means for allowing said armature to tilt to a second position whereby said ignition switch is moved to open circuit position while said main switch is maintained in closed circuit position, a thermally means responsive to combustion conditions for controlling the energization of both of said magnetic means.

2. In an electrical control circuit for a combustion system comprising a motor therefor which is connected in a circuit of relatively high voltage, a main switch for energizing said motor, an ignition switch for energizing the ignition means of said combustion system, a transformer for energizing a low voltage circuit, automatic means in said low voltage circuit for controlling the operation of said main switch and said ignition switch, said automatic means including an armature upon which said main switch and said ignition switch are mounted, magnetic means for tilting said armature to one position whereby said switches are moved to closed circuit positions to initiate combustion, and another magnetic means for allowing said armature to tilt to a second position whereby said ignition switch is moved to open circuit position while said main switch is maintained in closed circuit position, a thermally operated double-throw switch in said low voltage circuit for controlling the energization of said magnetic means in accordance with combustion conditions, and thermally operative means in said low voltage circuit responsive to failure of said thermally operated switch to operate normally for opening said control circuits.

3. In an electrical control circuit for a combustion system comprising a motor therefor which is connected in a circuit of relatively high voltage, a main switch for energizing said motor, an ignition switch for energizing the ignition means of said combustion system, a transformer for energizing a low voltage circuit, automatic means in said low voltage circuit for controlling the operation of said main switch and said ignition switch, said automatic means including an armature upon which said main switch and said ignition switch are mounted, magnetic means for tilting said armature to one position whereby said switches are moved to closed circuit positions to initiate combustion, and another magnetic means for allowing said armature to tilt to a second position whereby said ignition switch is moved to open circuit position while said main switch is maintained in closed circuit position, a thermally operated double-throw switch in said low voltage circuit for controlling the energization of said magnetic means in accordance with combustion conditions, and a time limit circuit breaker the actuation of which is controlled by the flow of current in said low voltage circuit for opening said control circuits in response to failure of said thermally operated switch to operate normally.

4. In an electrical control circuit for a combustion system comprising a motor therefor which is connected in a circuit of relatively high voltage, a main switch for energizing said motor, an ignition switch for energizing the ignition means of said combustion system, a transformer for energizing a low voltage circuit, automatic means in said low voltage circuit for controlling the operation of said main switch and said ignition switch, said automatic means including an armature upon which said main switch and said ignition switch are mounted, magnetic means for tilting said armature to one position whereby said switches are moved to closed circuit positions to initiate combustion, and another magnetic means for allowing said armature to tilt to a second position whereby said ignition switch is moved to open circuit position while said main switch is maintained in closed circuit position, a thermally operated double-throw switch in said low voltage circuit for controlling the energization of said magnetic means in accordance with combustion conditions, and another thermally operative means in circuit with said magnetic means and responsive to failure of said first-mentioned thermally operated switch to operate normally for automatically deenergizing said motor.

5. In an electrical control circuit for a combustion system comprising a motor therefor which is connected in a circuit of relatively high voltage, a main switch for energizing said motor, an ignition switch for energizing the ignition means of said combustion system, a transformer for energizing a low voltage circuit, an electromagnet including a pair of coils connected in said low voltage circuit for actuating said main switch and said ignition switch, a combustion-responsive double-throw switch in said low voltage circuit for controlling the energization of one of said coils in one position and the other of said coils in its other position, and means in series with one of said coils responsive to failure of said combustion-responsive switch to operate normally for causing deenergization of the system.

6. An electrical control circuit for a combustion system comprising a fuel supply means which is connected in a circuit of relatively high voltage, a main switch for energizing said fuel supply means, an ignition switch for energizing the ignition means of said combustion system, a transformer for energizing a low voltage circuit, magnetic means comprising a pull coil and a hold coil energized by said low voltage circuit for actuating said ignition and main switches, a double-throw switch in said low voltage circuit responsive to the combustion of said fuel supply for controlling the energization of said pull coil prior to the establishment of combustion and of said hold coil subsequent to the establishment of combustion, and a time limit circuit breaker energized by the current flow obtaining in said low voltage circuit and energizing said pull coil, operation of said time limit circuit breaker terminating the operation of said system.

7. An electrical control circuit for a combustion system comprising a motor therefor which is connected in a circuit of relatively high voltage, a main switch for energizing said motor, an ignition switch for energizing the ignition means of said combustion system, a transformer for energizing a low voltage circuit, magnetic means in said low voltage circuit for controlling the operation of said main switch and said ignition switch, said magnetic means including an armature upon which said main switch and said ignition switch are mounted, a plurality of coils connected in said low voltage circuit for actuating said armature, one of said coils serving to move said armature to such a position that both said main switch and said ignition switch are in closed circuit positions and another of said coils allowing said armature to move to a second position whereby only said ignition switch is moved to open circuit position, a double-throw switch responsive to combustion conditions for controlling the energization of said coils, and safety control means whereby said control circuits are automatically opened if said coil initially moving said main switch and said ignition switch to closed circuit positions is maintained energized for over a predetermined length of time.

8. In an electrical control circuit for a combustion system comprising a motor therefor which is connected in a circuit of relatively high voltage, a main switch for energizing said motor, an ignition switch for energizing the ignition means of said combustion system, a transformer for energizing a low voltage circuit, an electromagnet including a pair of coils connected in said low voltage circuit for actuating said main switch and said ignition switch, a combustion-responsive double-throw switch in said low voltage circuit for controlling the energization of one of said coils in one position and the other of said coils in its other position, an electric heating element connected in series with one of said coils, and a thermal responsive member controlled by said electric heating element for terminating the operation of the system upon failure of said combustion-responsive switch to operate normally, the system thereafter remaining out of operation until manually restored to operative condition.

9. An electrical control circuit for a combustion system comprising a fuel supply means which is connected in a circuit of relatively high voltage, a main switch for energizing said fuel supply means, an ignition switch for energizing the ignition means of said combustion system, a transformer for energizing a low voltage circuit, magnetic means comprising a pull coil and a hold coil energized by said low voltage circuit for actuating said ignition and main switches, a double-throw switch in said low voltage circuit responsive to the combustion of said fuel supply for controlling the energization of said pull coil prior to the establishment of combustion and of said hold coil subsequent to the establishment of combustion, and a thermally operated lock-out switch for terminating the operation of the system subject only to manual restoration, said lock-out switch comprising an electric heating element connected in series with said pull coil in said low voltage circuit and a thermal responsive member controlled by said electric heating element.

10. In an electrical control circuit for a combustion system comprising a motor therefor which is connected in a circuit of relatively high voltage, a main switch for energizing said motor, an ignition switch for energizing the ignition means of said combustion system, a transformer for energizing a low voltage circuit, automatic means in said low voltage circuit for controlling the operation of said main switch and said ignition switch, said automatic means including magnetic means for moving both said switches to closed circuit positions, and a second magnetic means for allowing said ignition switch to move to open position while said main switch is maintained in closed circuit position, and thermal means responsive to combustion conditions for controlling the energization of both of said magnetic means.

11. In an electrical control circuit for a combustion system comprising an electrical device for controlling the flow of fuel, a main switch for energizing said device, an ignition switch for energizing the ignition means of said combustion system, automatic means for controlling the operation of said main switch and said ignition switch, said automatic means including magnetic means for tilting both said switches to closed circuit positions to initiate combuston, and another magnetic means for allowing said ignition switch to move to open circuit position while said main switch is maintained in closed circuit position, and thermal means responsive to combustion conditons for controlling the energization of both of said magnetic means.

12. In an electrical control circuit for a combustion system comprising an electrical device for controlling the supply of fuel, a main switch for energizing said device, an ignition switch for energizing the ignition means of said combustion system, magnetc means for operating the main switch and ignition switch, and thermal means responsive to combustion conditions for energizing the magnetic means sufficiently in the absence of combustion to move both said switches to closed circuit positions and in the presence of combustion to allow said ignition switch to move to open circuit position while maintaining said main switch in closed circuit position.

13. In a control circuit for a combustion system including an electrical device for controlling the flow of fuel, a main switch for energizing said electrical device when closed, a room thermostat, a safety cut-out switch in series with the electrical device and the main switch, a heating element therefor, magnetic means, a thermal element responsive to combustion conditions, a switch held in closed position thereby in the absence of combustion, a circuit for energizing the magnetic means sufficiently to move the main switch to closed position, said circuit including the room thermostat, at least a portion of the magnetic means, the heating element and the combustion controlled contacts in series, whereby said circuit cannot be energized except when completed through said heating element, and a second circuit for energizing the magnetic means subsequent to the establishment of combustion only sufficiently to maintain said main switch closed but not to close it, said second circuit including the room thermostat and at least a portion of the magnetic means, but not the heating element.

14. In a fuel burner control system, in combination, a source of electrical supply, electrically operated means for supplying fuel to the burner, a switch in circuit between said electrically operated means and said source, electromagnetic means for controlling the operation of said switch, a main control for effecting energization of a portion of said electromagnetic means to actuate said switch from open to closed positon, thermo-electric means for stopping operation of said electrically operated means upon failure of combustion and comprising an electric heating element connected in series with said portion of said electromagnetic means whereby the latter cannot be energized when the circuit through said electric heating element is broken, and means responsive to the existence of combustion at the burner for operatively deenergizing said electric heating element and for effecting energization of another portion of said electromagnetic means in such manner that the magnetic effect of said electromagnetic means is reduced to a value sufficient to maintain said switch in closed position but insufficient to actuate said switch from open to closed position.

LAWRENCE E. KOCH.

CERTIFICATE OF CORRECTION.

Patent No. 1,940,718.　　　　　　　　　　　　　　　December 26, 1933.

LAWRENCE E. KOCH.

It is hereby certified that error appears in the printed specification of the above numbered patent requiring correction as follows: Page 2, line 13, for the misspelled word "swicth" read switch; page 6, line 40, for "elements" read element; page 7, line 127, strike out the word "switch"; page 8, line 108, claim 1, for "a thermally" read and thermal; page 10, line 39, claim 12, for "magnetc" read magnetic; and that the said Letters Patent should be read with these corrections therein that the same may conform to the record of the case in the Patent Office.

Signed and sealed this 3rd day of April, A. D. 1934.

F. M. Hopkins (Seal)

Acting Commissioner of Patents.